United States Patent [19]

Girsch et al.

[11] Patent Number: 4,508,512
[45] Date of Patent: Apr. 2, 1985

[54] SHAPE-MATCHING TOY APPARATUS WITH SAFETY HINGE

[75] Inventors: B. J. Maria Girsch; Charles W. Girsch, both of St. Paul, Minn.; Thomas C. McCarthy, Lincoln, R.I.

[73] Assignee: Hasbro Industries, Inc., Pawtucket, R.I.

[21] Appl. No.: 436,719

[22] Filed: Oct. 25, 1982

[51] Int. Cl.³ ............................................. G09B 19/00
[52] U.S. Cl. ...................................... 434/259; 446/73
[58] Field of Search ............... 434/259, 264; 273/1 G, 273/1 GE, 1 GF; 46/123, 141, 116, 171, 1 A; 16/225; 124/10

[56] References Cited

U.S. PATENT DOCUMENTS

| | | | |
|---|---|---|---|
| 2,747,297 | 5/1956 | Zalkind | 434/259 |
| 2,911,740 | 11/1959 | Miller | 434/259 |
| 3,181,867 | 5/1965 | Dreyer | 273/282 |
| 4,200,197 | 4/1980 | Meyer | 46/123 X |
| 4,231,181 | 11/1980 | Fabricant | 434/264 X |
| 4,323,238 | 4/1982 | Jernstrom | 434/259 X |
| 4,324,065 | 4/1982 | Cooper | 273/1 GF X |

Primary Examiner—Harland S. Skogquist
Attorney, Agent, or Firm—Salter & Michaelson

[57] ABSTRACT

A shape-matching educational toy apparatus includes a first plate having a plurality of different shape apertures therein and a plurality of block elements of corresponding shapes which are receivable in the apertures. The block elements are retained in the apertures by resilient retaining elements until a second plate engages the block elements to push them therethrough. The second plate is hingedly attached to the first plate but resiliently upwardly displaceable relative thereto whereby when an obstruction such as a child's finger is interposed between the plates, injury is avoided.

7 Claims, 8 Drawing Figures

SHAPE-MATCHING TOY APPARATUS WITH SAFETY HINGE

BACKGROUND AND SUMMARY OF THE INVENTION

The instant invention relates to educational toys and more particularly to an educational toy which may be utilized to aid in the development of a child's manual dexterity and hand-to-eye coordination.

It is a well accepted fact that the development of a child's ability to match and sort elements of various shapes and to position the elements in apertures of corresponding shapes can be a significant factor in a child's early education. In this connection, the mastering of such skills can significantly aid in the development of a child's manual dexterity and hand-to-eye coordination at an early age.

A number of educational devices or toys wherein a variety of differently shaped block elements are sorted and positioned in apertures of corresponding shapes have heretofore been available. In this regard, the U.S. patents to GATES, U.S. Pat. No. 741,903; MILLER, U.S. Pat. No. 2,911,740; MINDEL, U.S. Pat. No. 2,623,303; MATSUMOTO, U.S. Pat. No. 3,760,511; SEIJIRO, U.S. Pat. No. 4,149,717 and TUCKER et al, U.S. Pat. No. 4,195,421 are generally illustrative and represent the closest prior art to the instant invention of which the applicant is aware. All of the above patents disclose devices wherein block elements of various shapes may be matched with apertures of corresponding shapes so that the block elements pass through respective apertures.

The instant invention embodies the above described shape-matching concept with significant new and improved features and thereby provides a novel and effective shape-matching apparatus which is both amusing and educational to a child. Specifically, the toy apparatus of the instant invention comprises a first plate having a plurality of differently shaped apertures therein, and a second plate which is hingedly attached to the first plate and which is hingeable between an outwardly pivoted open position and a closed position wherein it is in adjacent, substantially parallel relation to the first plate. A plurality of block elements of shapes which correspond to the shapes of the apertures are receivable in the apertures, and resiliently deflectable retaining means are provided for retaining the block element in their respective apertures while nevertheless allowing the block elements to resiliently pass through the respective apertures upon the application of downward force thereto. Accordingly, the block elements are positionable in the apertures where they are releasably held by the deflectable retaining means; then when the second plate is moved toward its closed position, it engages the block elements and forces them through the apertures. In the preferred embodiment, the apparatus is in the configuration of an amusing character whose mouth is in an open position when the second plate is hinged upwardly and whose mouth is in a closed position when the second plate is hinged downwardly to its closed position.

In addition to the novel shape sorting features of the apparatus of the instant invention, it embodies a novel safety hinge construction which is utilized to hingedly secure the upper second plate to the lower first plate. In this connection, the hinge construction includes a pair of arcuately shaped resilient elements which are integrally attached to the upper second plate. The opposite extremities of the arcuate resilient elements are hingedly attached to the lower first plate; and hence when an obstruction is encountered between the first and second plates as the second plate is pivoted to its closed position, the resilient elements yield allowing the upper plate to be displaced upwardly to provide clearance for the obstruction. Therefore, when a child's finger or the like is accidentally caught between the upper and lower plates as they are hinged together, the upper plate is resiliently displaced, preventing injury to the child's finger.

Accordingly, it is a primary object of the instant invention to provide an educational shape-sorting toy apparatus wherein block elements are resiliently retainable in apertures but can be moved through the apertures upon the application of downward force thereto, Another object of the instant invention is to provide a shape-sorting toy apparatus wherein a plate is hingeable to resiliently depress block elements through correspondingly shaped apertures.

A further object of the instant invention is to provide a shape-sorting apparatus wherein first and second plates are hingeable to urge block elements through correspondingly shaped apertures, but wherein the hinged interconnection between the first and second plates is resiliently displaceable to provide clearance between the plates for an obstruction, such as a child's finger.

Another object of the instant invention is to provide a novel construction for a safety hinge for use in children's toys.

Other objects, features and advantages of the invention shall become apparent as the description thereof proceeds when considered in connection with the accompanying illustrative drawings.

DESCRIPTION OF THE DRAWINGS

In the drawings which illustrate the best mode presently contemplated for carrying out the present invention.

DESCRIPTION OF THE INVENTION

Figure 1:
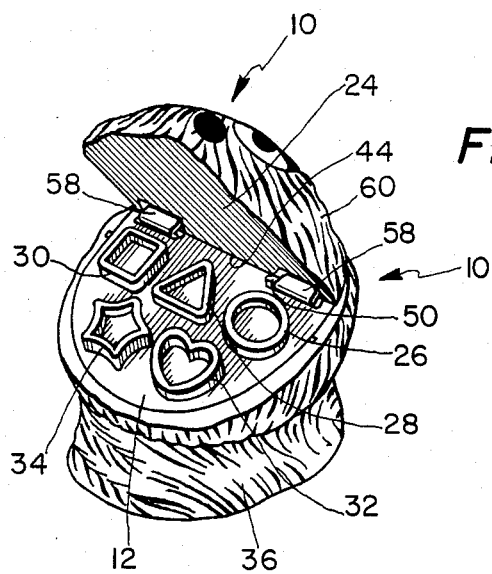
FIG. 1 is a perspective view of the toy apparatus of the instant invention with the plates of the apparatus in the open positions thereof.
Figure 2:
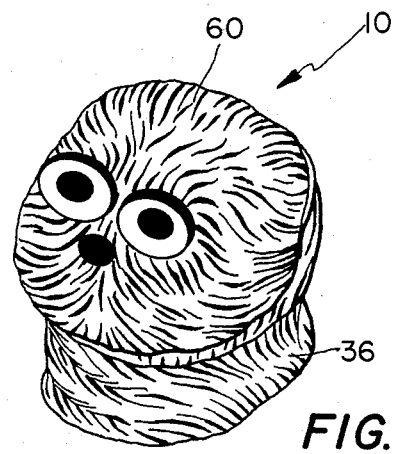
FIG. 2 is a perspective view with the plates in the closed positions thereof.
Figure 3:
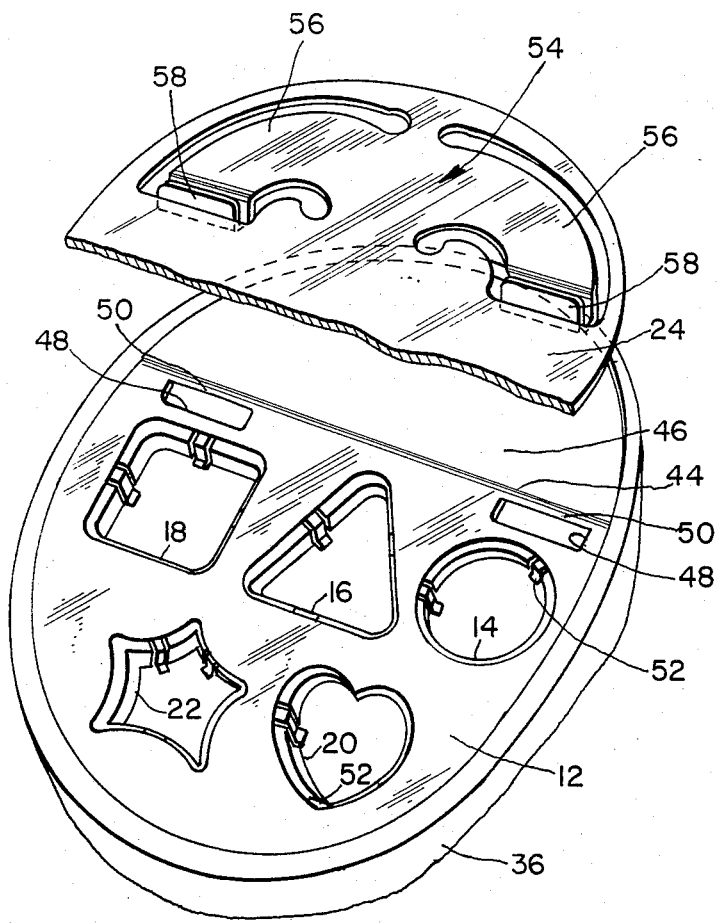
FIG. 3 is an enlarged, exploded, fragmentary, perspective view of the lower plate and of the hinge components which hingedly interconnect the upper and lower plates.
Figure 4:
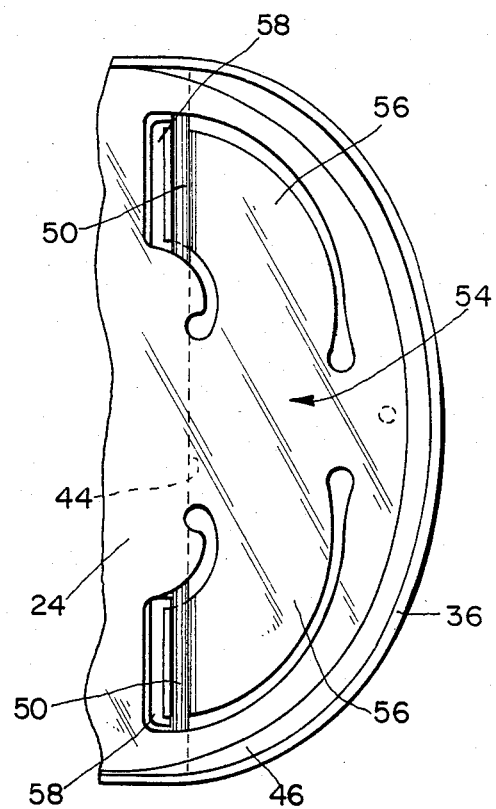
FIG. 4 is a fragmentary top plan view of the hinge components in assembled relation.
Figure 5:
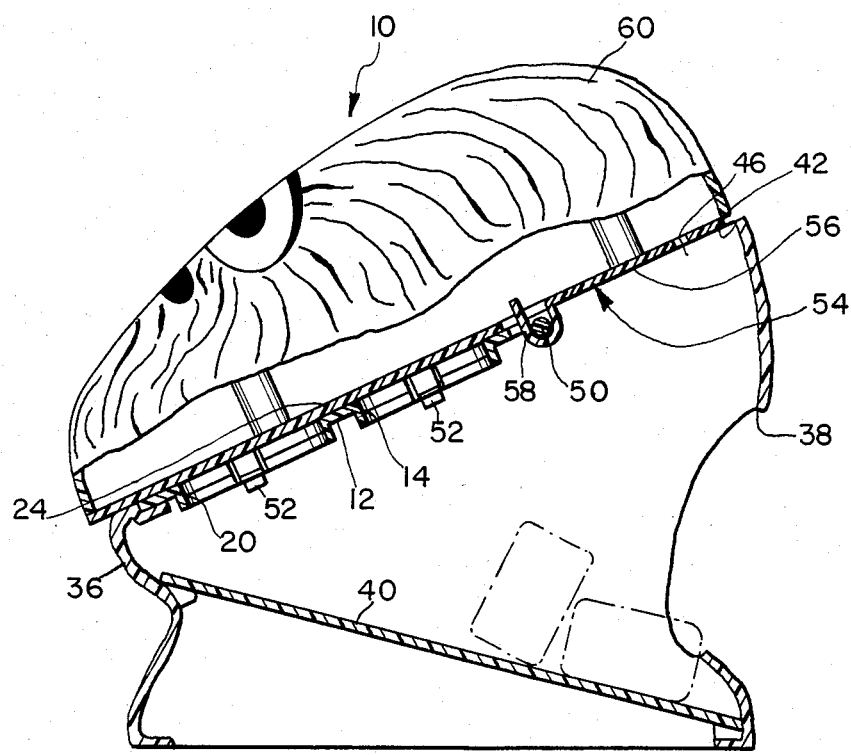
FIG. 5 is a view partly in section of the apparatus with the first and second plates in their closed positions.
Figure 6:
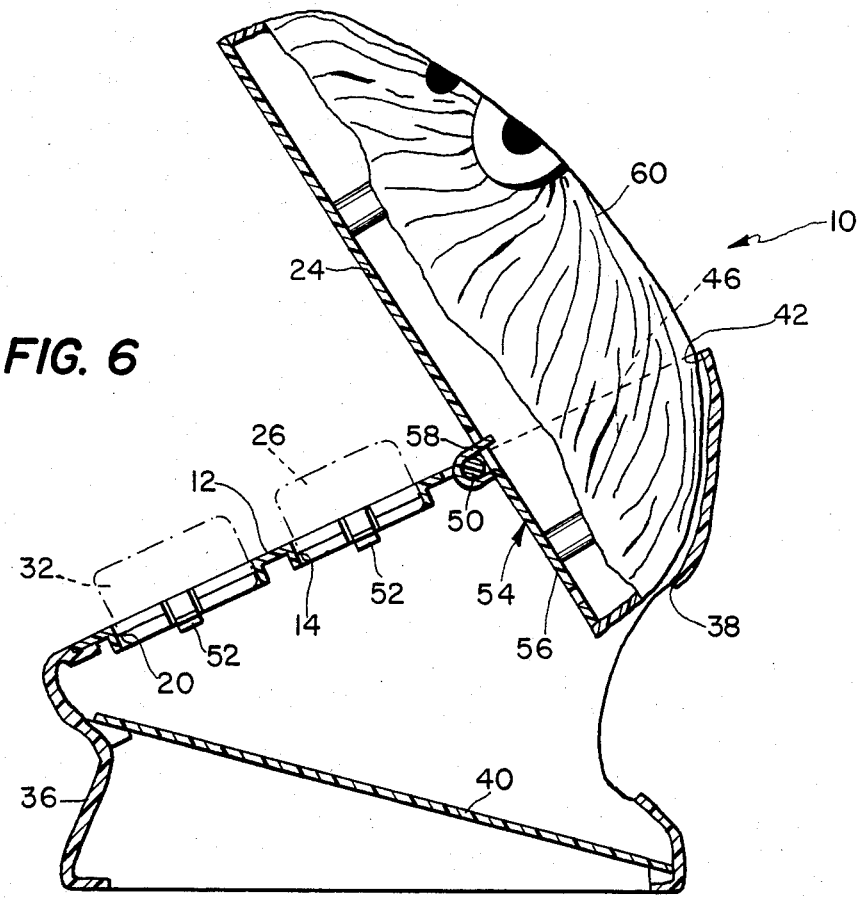
FIG. 6 is a similar view with the plates in the open positions thereof.

Referring now to the drawing, particularly FIGS. 1, 2, 5, 6 and 7, the apparatus of the instant invention is illustrated and generally indicated at 10. The apparatus 10, as will be seen particularly from FIGS. 1 and 2, embodies an amusing character and is movable between a first open position wherein the character has the appearance of having an open mouth and a second closed position wherein the character has the appearance of having a closed mouth. When the apparatus is in the open position thereof, block elements of various shapes may be positioned in apertures of corresponding shapes; and thereafter when the apparatus is moved to the closed position thereof, the block elements are forced through the apertures, as will hereinafter be more fully set forth.

Generally the apparatus of the instant invention comprises a lower or first plate 12 having a plurality of apertures 14, 16, 18, 20 and 22 therein, and an upper or second plate 24 which is hingedly attached to the lower plate 12. A plurality of block elements 26, 28, 30, 32 and 34, which correspond in shape to the apertures 14, 16, 18, 20 and 22, respectively, are provided and are receivable in said corresponding apertures. The plate 12 is supported in an inclined disposition on a lower housing 36 whereby when the apparatus 10 is positioned on a supporting surface, the plate 12 is maintained in spaced relation to said surface so that the block elements 26, 28, 30, 32 and 34 can pass through their respective apertures 14, 16, 18, 20 and 22 into the lower housing 36.

The lower housing 36 is preferably molded in a hollow configuration of a suitable rigid plastic material and has a rear access opening 38 therein. A ramp 40 is mounted in an inclined disposition within the housing 36, and is downwardly directed generally toward the access opening 38 whereby after the block elements 26, 28, 30, 32 and 34 have passed through their respective apertures, they gravitate downwardly within the housing 36 toward the access opening 38. The upper periphery of the housing 36 defines an oval-shaped opening 42 wherein the first plate 12 is mounted.

As will be seen, the front portion of the plate 12 is also of generally arcuate configuration and is received in the front portion of the opening 42. The rear extremity of the plate 12 is defined by a generally straight hinge axis 44 so that an open area 46 is provided to the rear of the plate 12. Slots 48 are provided in the rear portion of the plate 12, defining hinge pins 50 along the hinge line 44. Extending downwardly and inwardly at spaced locations around the peripheries of the apertures 14, 16, 18, 20 and 22 are integrally struck resilient retainer elements 52. The retainer elements 52 extend slightly inwardly in the respective apertures 14, 16, 18, 20 and 22 but are resiliently movable outwardly to permit the block elements 26, 28, 30, 32 and 34 to pass through their respective apertures.

The upper or second plate 24 is integrally molded with an upper hinge plate 54, the upper plate 24 and the hinge plate 54 cooperating to define an oval-shaped substantially planar element which is of substantially the same configuration although slightly smaller dimension than the opening 42. The hinge plate 54 includes a pair of arcuate leaf elements 56 which integrally extend outwardly and forwardly from the rear portion of the hinge plate 54 and terminate in upwardly facing U-shaped ends 58. An upper housing 60 is mounted on the upper plate 24 as illustrated.

In assembled relation, the upper housing 60, the upper plate 24 and the upper hinge plate 54 are hingedly mounted on the lower plate 12. Specifically, the hinge pins 50 are received in the upwardly facing U-shaped ends 58 whereby the upper plate 24 and the hinge plate 54 are pivotable about the hinge axis 44. In this connection, it will be seen that when the housing 60, the upper plate 24 and the upper hinge plate 54 are pivoted to an open position in this manner, the open area 46 provides clearance for the hinge plate 54 and the adjacent rear portions of the housing 60, as illustrated more clearly in FIG. 6. When the plate 24, the hinge plate 54 and the housing 60 are pivoted to the closed position illustrated in FIG. 5, the plate 24 generally overlies the plate 12. Further, as will be noted particularly from FIGS. 1 and 2, the upper and lower housings 60 and 36, respectively, are formed so that they cooperate to define an amusing character whose mouth is generally defined by the plates 12 and 24, the character's mouth being open when the plate 24 is hinged to an open position and being closed when the plate 24 is hinged to a closed position.

Accordingly, it is seen that the apparatus 10 provides an effective educational toy which may be utilized in the development of a child's manual dexterity and hand-to-eye coordination. The block elements 26, 28, 30, 32 and 34 are receivable in their respective apertures 14, 16, 18, 20 and 22, and are retained therein by the elements 52. In this connection, the elements 52 engage the block elements to retain them in their respective apertures with the lower portions of said block elements recessed beneath the upper surface of the plate 12. Therefore, a child may position all of the block elements in their respective apertures without having the block elements pass through the plate 12. However, when the plate 24 is moved to the closed position thereof, it engages the block elements 26, 28, 30, 32 and 34 to urge them downwardly whereby the retainer elements 52 are cammed outwardly allowing said block elements to pass through their respective apertures. After the block elements have passed through their respective apertures, they fall onto the ramp 40 and gravitate downwardly so that they are accessible through the access opening 38.

Figure 7:
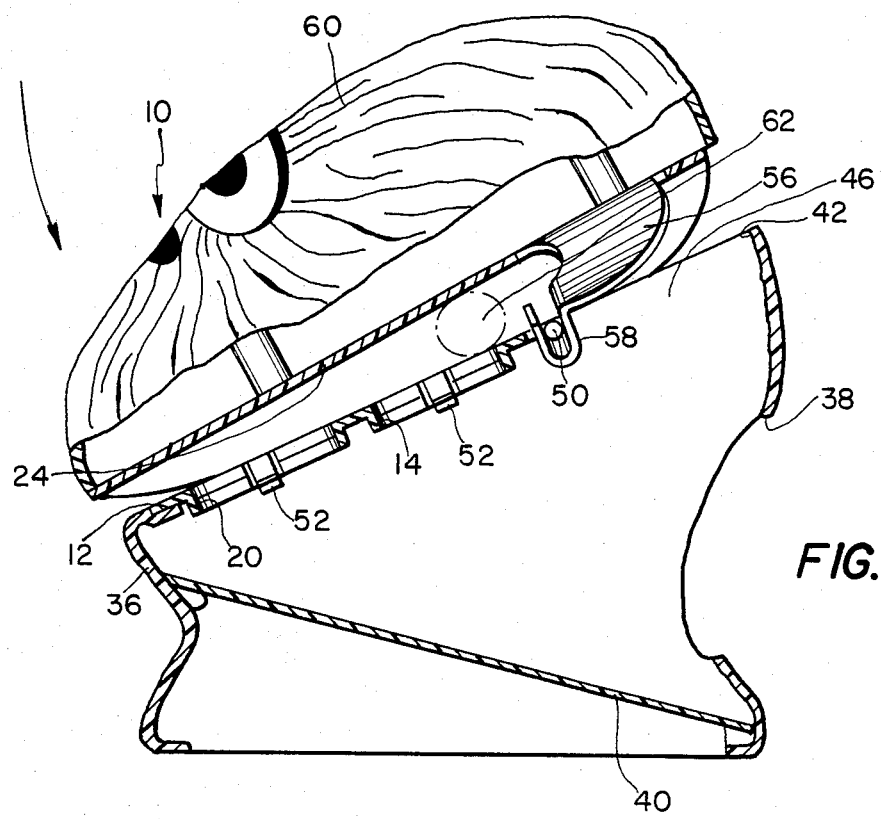
FIG. 7 is a view partly in section of the apparatus with the plates in the closed positions thereof and with an obstruction interposed between said plates.
Figure 8:
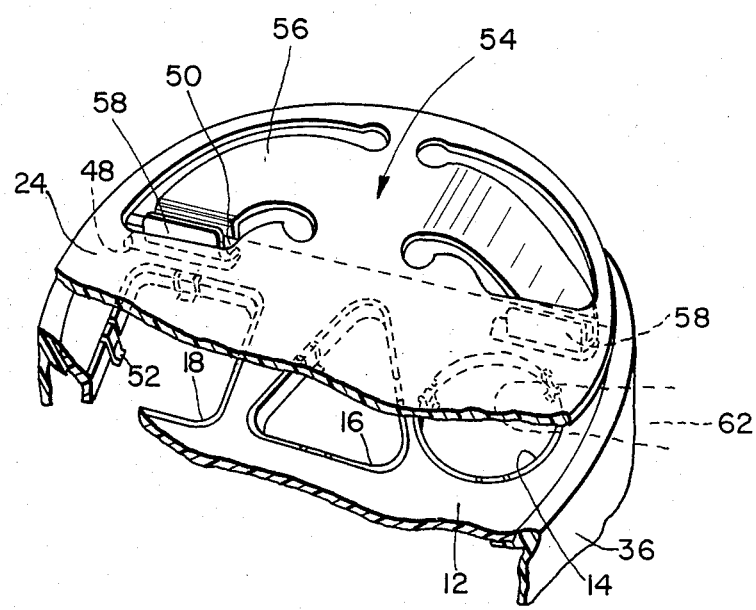
FIG. 8 is a fragmentary perspective view of the hinge components of the apparatus with an obstruction interposed between the plates.

Referring now specifically to FIGS. 7 and 8, it will be seen that the hinge plate 54 and the pins 50 provide a novel safety hinge construction in the apparatus 10. Specifically, when an obstruction such as a child's finger, indicated at 62, is interposed between the plates 12 and 24 and the plate 24 is hinged to the closed position thereof, the leaf elements 56 resiliently yield to allow the plate 24 to be displaced outwardly. Also, as will be seen from FIG. 7, when this occurs, the open configuration of the U-shaped ends 58 allows portions of said ends 58 to be displaced slightly from their respective pins as the leafs 56 are flexed. Accordingly, damage to the child's finger 62 or any other similarly positioned obstruction is prevented.

It is seen therefore that the instant invention provides both a novel and interesting educational toy and a novel safety hinge construction. A child can derive substantial educational benefit from learning to sort the block elements and position them in their appropriate apertures. The amusing character configuration of the apparatus 10 and operation thereof wherein the mouth of the character is closed to press the various block elements through their respective apertures can be effective at capturing the attention of a small child. Further, the novel hinge construction embodied in the apparatus 10 eliminates the danger of a child injuring his or her fingers as was possible with the heretofore known hingeable toy appratus. Accordingly, the apparatus of the instant invention represents a significant advancement in the art for its educational, amusement and safety values.

While there is shown and described herein certain specific structure embodying this invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. A toy apparatus comprising:
   a. a first plate having a plurality of apertures of different configurations therein;
   b. means for supporting said plate in spaced relation above a supporting surface;
   c. a plurality of three-dimensional block elements corresponding in configuration to said apertures and receivable in corresponding apertures;
   d. retaining means for resiliently retaining said block elements in their corresponding apertures, so that they project upwardly at least slightly from the upper surface of said plate, said retaining means being resiliently deflectable to allow said block elements to pass through the corresponding apertures upon the application of appropriately directed force to said block elements;
   e. a second plate; and
   f. means hingedly connecting said second plate to said first plate so that it is movable between a first open position wherein said second plate is hinged upwardly relative to said first plate and a second closed position wherein said second plate is in adjacent, substantially parallel relation to said first plate, whereby when said block elements are disposed in their corresponding apertures and said second plate is moved to said closed position thereof, said second plate engages said block elements to resiliently deflect said retaining means so that said block elements pass through their corresponding apertures, said hinge means being resiliently deflectable to a position wherein said second plate is in slightly upwardly displaced relation to said first plate, and comprising a pair of resiliently flexible leaf element, each having a U-shaped end, opposite ends of said leaf elements being attached to the rear portion of said second plate, a pair of coaxially disposed hinge pins attached to said first plate rearwardly of the apertures therein, one fo said pins being received in each of said U-shaped ends to hingedly attach said second plate to said first plate while nevertheless permitting slight displacement of said U-shaped ends from their respective pins when the respective leaf elements are resiliently flexed, said leaf elements extending generally forwardly and arcuately outwardly from said second plate to said hinge pins, whereby said second plate is hingeable relative to said first plate as a result of the hinged connection of said leaf elements thereto, and resiliently movable to said upwardly displaced position as a result of the resilient flexibility of said leaf elements.

2. A toy apparatus comprising:
   a. a first plate having a plurality of apertures of different configurations therein;
   b. means for supporting said plate in spaced relation above a supporting surface;
   c. a plurality of three-dimensional block elements corresponding in configuration to said apertures and receivable in corresponding apertures;
   d. retaining means for resiliently retaining said block elements in their corresponding apertures, so that they project upwardly at least slightly from the upper surface of said plate, said retaining means being resiliently deflectable to allow said block elements to pass through the corresponding apertures upon the application of appropriately directed force to said block elements;
   e. a second plate; and
   f. means hingedly connecting said second plate to said first plate so that it is movable between a first open position wherein said second plate is hinged upwardly relative to said first plate and a second closed position wherein said second plate is in adjacent, substantially parallel relation to said first plate, whereby when said block elements are disposed in their corresponding apertures and said second plate is moved to said closed position thereof, said second plate engages said block elements to resiliently deflect said retaining means so that said block elements pass through their corresponding apertures.

3. In the toy apparatus of claim 2, said support means further characterized as a lower housing having an access opening therein, said toy appratus further comprising a ramp disposed within said lower housing in spaced relation beneath said first plate, said ramp being downwardly inclined toward said access opening whereby when said block elements pass through said apertures they fall onto said ramp and are directed to said access opening.

4. The toy of claim 3 further comprising an upper housing attached to said second plate and hingeable therewith, said upper and lower housings cooperating to define a three-dimensional character whose mouth is in an open position when said second plate is in its open position and whose mouth is in a substantially closed position when said second plate is in its closed position.

5. In the toy apparatus of claim 2, said hinge means further characterized as being resiliently deflectable to a position wherein said second plate is slightly upwardly displaced relative to said first plate.

6. In the toy apparatus of claim 5, said hinge means comprising a resiliently flexible leaf element, one end of said leaf element being hingedly attached to said first plate, the opposite end of said leaf element being attached to said second plate whereby said second plate is hingeable relative to said first plate as a result of the hinged connection of said leaf element thereto, and resiliently movable to said upwardly displaced position as a result of the resilient flexibility of said leaf element.

7. The toy apparatus of claim 6, further comprising a pair of said leaf elements, said leaf elements being of arcuate configuration and being hingedly attached to said first plate along a hinge axis which is disposed rearwardly of said apertures on said first plate, said leaf elements being attached to the rear portion of said second plate and extending generally forwardly and arcuately outwardly and terminating at said hinge axis.

* * * * *